United States Patent [19]

Terashita

[11] Patent Number: 5,148,213
[45] Date of Patent: Sep. 15, 1992

[54] PRINTING METHOD FOR PHOTOGRAPHIC PRINTER

[75] Inventor: Takaaki Terashita, Kanagawa, Japan

[73] Assignee: Fuji Photo Film Co., Ltd., Kanagawa, Japan

[21] Appl. No.: 779,899

[22] Filed: Oct. 21, 1991

[30] Foreign Application Priority Data

Oct. 24, 1990 [JP] Japan ................ 2-286189

[51] Int. Cl.$^5$ ............................ G03B 27/80
[52] U.S. Cl. ........................... 355/38; 355/77
[58] Field of Search ............ 355/32, 35, 38, 68, 355/77; 358/80, 76; 356/444, 404

[56] References Cited

FOREIGN PATENT DOCUMENTS

| 51-112345 | 10/1976 | Japan . |
| 56-1039 | 1/1981 | Japan . |
| 57-21136 | 2/1982 | Japan . |
| 59-220760 | 12/1984 | Japan . |
| 59-220761 | 12/1984 | Japan . |
| 6191648 | 5/1986 | Japan . |
| 62-144158 | 6/1987 | Japan . |
| 2-93448 | 4/1990 | Japan . |

Primary Examiner—L. T. Hix
Assistant Examiner—D. Rutledge
Attorney, Agent, or Firm—Sughrue, Mion, Zinn, Macepak & Seas

[57] ABSTRACT

A printing method using a photographic printer which effects at an identical or proximate position photometry conducted by dividing an image frame into a multiplicity of segments and exposure based on data obtained by photometry. The process of effecting both photometry, and selecting and storing data necessary for determination of exposure amount is repeated until the number of items of the data stored reaches a predetermined value or more. When the number of items of the data stored has reached the predetermined value or more, an image frame to be printed is positioned in an exposing position, and exposure is effected on the basis of photometric data on the image frame and the stored data.

16 Claims, 7 Drawing Sheets

PRINTING METHOD FOR PHOTOGRAPHIC PRINTER

BACKGROUND OF THE INVENTION

1. Field of the Invention

The present invention relates to a printing method for a photographic printer, and more particularly to a printing method for a photographic printer which effects printing using an exposure amount determined by analyzing photometric data on a plurality of image frames.

2. Description of the Related Art

Methods of printing by analyzing photometric data on a plurality of image frames are described in Japanese Patent Application Laid-Open Nos. 59-220761, 61.91648, and 2-93448. In the technique disclosed in Japanese Patent Application Laid-Open No. 59-220761, data on a multiplicity of frames photometrically measured by an image-frame photometric section is analyzed so as to be used for determination of exposure amount by an exposure section provided separately from the photometric section. With this technique, since the image-frame photometric section and the exposure section are separated from each other, there is a drawback in that the apparatus becomes large in size. In the technique disclosed in Japanese Patent Application Laid-Open No. 61-91648, the image-frame photometric section and the exposure section are disposed in proximity to each other, and a film takeup section is provided While a roll of film is being taken up by the film takeup section, photometry is conducted with respect to the entire roll of film, and an exposure amount is determined on the basis of the photometric data on the whole roll of film and photometric data on individual image frames to be printed, thereby to effect printing Since the photometric section and the exposure section are disposed in proximity to each other, this technique makes it possible to prevent the apparatus from becoming large in size. However, since the film needs to be taken up by the film takeup section, printing is difficult in the case of short pieces of negative film that are difficult to take up and specific image frames that require taking up and rewinding. In the technique disclosed in Japanese Patent Application Laid-Open No. 2-93448, the photometric section and the exposure section are disposed at the same location, and photometric data on a multiplicity of frames are accumulated for each type of film and are used for exposure control. With this technique, since the photometric section and the exposure section are disposed at the same location, it is unnecessary to effect taking up of the film, and therefore, piece negatives and specific image frames can be effected readily. However, it is necessary to make the type of film correspond to the accumulated data, and when the type of film is unknown, printing is difficult.

In addition, with the above-described techniques, since data on a multiplicity of image frames, such as photometric data on a roll of film, are required, there is a problem in that it takes time to accumulate image-frame data, and processing capabilities decline as a result It should be noted that a technique concerning the analysis of photometric data is also disclosed in Japanese Patent Application Laid-Open No. 59-220760. In addition, printers for determining exposure amount by using photometric data on a roll of film are disclosed in Japanese Patent Application Laid-Open No. 51-112345, Japanese Patent Application Laid-Open No. 57-211136 (U.S. Pat. No. 4,416,539), and the like.

SUMMARY OF THE INVENTION

Accordingly, it is an object of the present invention to provide a printing method for a photographic printer capable of printing a roll of film or a piece of negative film with high processing capabilities, thereby overcoming the above-described drawbacks of the conventional art.

To this end, in accordance with one aspect of the present invention, in printing an image by conducting at an identical or proximate position, photometry effected by dividing an image frame into a multiplicity of segments, and exposure based on data obtained by photometry, the process of effecting photometry by dividing the image frame into the multiplicity of segments by consecutively advancing the image frame and of selecting and storing data necessary for determination of exposure amount is repeated until the number of items of data stored reaches a predetermined value or more. When the number of items of data stored has reached the predetermined value or more, an image frame to be printed is positioned in an exposing position, and exposure is effected on the basis of photometric data on the image frame to be printed and the stored data.

In the present invention, if the number of items of data stored fails to reach the predetermined value or more even if photometry is conducted with respect to all the image frames of a roll of film, a determination may be made as to whether or not the image frame has undergone a color failure, and the method of using the stored data may be varied depending on whether an image frame has had a color failure or not.

The predetermined value is preferably set to be a value substantially equal to the number of items of photometric data on one image frame or a value up to several times the number of items of the photometric data on one image frame.

In accordance with another aspect of the present invention, in printing an image by conducting at an identical or proximate position, photometry effected by dividing an image frame into a multiplicity of segments, and exposure based on data obtained by photometry, a storage area is provided for each type of film after determining the type of film, and the process of effecting photometry by dividing the image frame into the multiplicity of segments by consecutively advancing the image frame, and of selecting and storing in a corresponding area data necessary for determination of exposure amount, is repeated until the number of items of data stored reaches a predetermined value or more. When the number of items of data stored has reached the predetermined value or more, an image frame to be printed is positioned in an exposing position, and exposure is effected on the basis of photometric data on the image frame to be printed and the stored data. The predetermined value in this case can be set in the same way as is done in accordance with the above-described aspect of the invention.

The basic principle of the present invention will be described with reference to FIG. 2. FIG. 2 shows on color coordinates respective average values of accumulated data on an initial frame, respective average values of accumulated data on up to a third frame, respective average values of accumulated data on one case, i.e., one roll of film, (about 20 frames), an average value of accumulated data on a multiplicity of frames (1,000 frames), and respective average values of accumulated data on an initial frame in a case where the initial frame is not an ordinary frame. It should be noted that the accumulated data referred to herein means data obtained by totalizing photometric values of all or some of photometric data excluding tricolor photometric data whose color balance differs substantially from average data. As can be appreciated from the diagram, both the average values of accumulated data on an initial frame and the average values of accumulated data on up to a third frame are substantially equal to the average values of accumulated data on one case. It should be noted, however, that there are fairly large variations in the average values of accumulated data on an initial frame. In addition, in both the average values of accumulated data on an initial frame and the average values of accumulated data on up to a third frame, those data which deviate substantially from the average values of accumulated data on one case or the average value of accumulated data on a multiplicity of frames are frames photographed under different types of light sources, such as the setting sun, a fluorescent lamp, or a tungsten lamp, and frames in which a color failure has occurred due to a blue sky, a green scene, or the like. In other words, it can be appreciated from FIG. 2 that with regard to ordinary frames there are no substantial differences in values either in the case of the average values of accumulated data on an initial frame or in the case of the average values of accumulated data on up to a third frame. Accordingly, in the present invention, exposure is commenced and printing is effected when items of data in a number necessary for determining exposure amount have been stored, as will be described below.

The operation of the present invention will be described hereinunder. The photographic printer in accordance with the present invention effects at an identical or proximate position, both photometry effected by dividing an image frame into a multiplicity of segments, and exposure based on data obtained by photometry. In printing an image frame by using this photographic printer, photometry is effected by dividing the image frame into a multiplicity of segments by consecutively advancing the image frame, and data necessary for determination of exposure amount is selected from the data obtained by photometry and is stored. This process of photometry and storage is repeated until the number of items of the data stored reaches a predetermined value or more. As this predetermined value, a value substantially equal to the number of items of photometric data on one image frame or a value up to several times that number of items of the photometric data is suitable. When the number of items of the data stored has reached the predetermined value or more, an image frame to be printed is positioned in an exposing position, exposure is commenced on the basis of both the photometric data on the image frame to be printed and the stored data, and printing is effected. Although the image frame to be positioned in the exposing position first is preferably the initial image frame among the image frames to be printed, any order may be followed.

If the number of items of the data stored fails to reach the predetermined value or more even if photometry is conducted with respect to all the image frames of one film, a determination is made as to whether or not the image frame has undergone a color failure, and the method of using the stored data is varied depending on whether or not the image frame has had a color failure. "Image frames having no color failure" referred to here means image frames (among those image frames for which the number of items of data stored fails to reach the predetermined value or more, even when photometry is conducted with respect to all the image frames of a roll of film, i.e., among abnormal image frames), whose color is imbalanced due to having been photographed under a type of light source other than daylight, or image frames which have undergone a large change over time. For instance, in the case of the image frame having a color failure, printing is effected by determining an exposure amount only on the basis of the stored data. Meanwhile, in the case of the image frame having no color failure, i.e., an image frame photographed under a different type of light source or an image film which has undergone a large change over time, photometric data on at least an initial image frame to be printed is stored, and printing is effected by determining an exposure amount on the basis of that stored photometric data.

In the above-described invention, it is possible to provide a storage area for each type of film by determining the type of film, and to store the data necessary for determination of exposure amount in a corresponding storage area. By adopting this measure, since a storage area is provided for each new film type, it is unnecessary to manually input data or store the data as initialization values in a memory by photometrically measuring a multiplicity of frames in advance. Thus, it is possible to automatically store necessary data with respect to new film types.

As described above, in accordance with the present invention, since exposure is commenced and printing is effected when the number of items of stored data has reached a predetermined value or more, an advantage can be obtained in that it is possible to reduce the time for storing data, and hence printing can be effected with high processing capabilities. Since most frames are normal images, this advantage is even greater.

In addition, with respect to abnormal image frames, since the method of using stored data is different for an image frame having a color failure and an image frame having no color failure, it is possible to obtain an advantage in that proper printing can be effected with respect to abnormal image frames as well.

Since a storage area is provided for each film type by determining the film type, it is possible to obtain advantages in that it is unnecessary to manually input data or store the data as initialization values in a memory by photometrically measuring a multiplicity of frames in advance, and in that it is possible to automatically store necessary data with respect to new film types.

DESCRIPTION OF THE PREFERRED EMBODIMENTS

Figure 3:
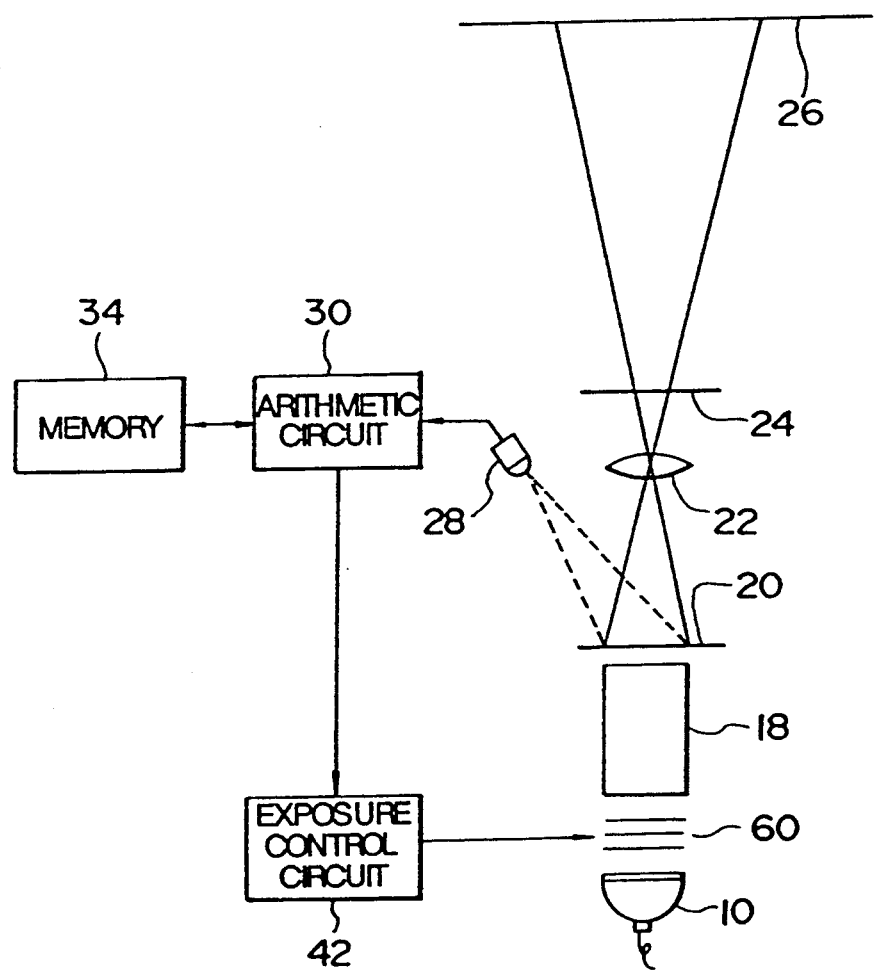
FIG. 3 is a schematic diagram of an automatic color printer to which the present invention is applied.

Referring now to the accompanying drawings, a detailed description will be made of the embodiments of the present invention. FIG. 3 schematically illustrates an automatic color printer to which the present invention is applied. A mirror box 18 and a lamp house 10 having a halogen lamp are arranged below a color negative film 20 which has been conveyed to a printing section by being loaded on a negative carrier. A light-adjusting filter 60 is interposed between the mirror box 18 and the lamp house 10. The light-adjusting filter 60 comprises three filters, a yellow (Y) filter, a magenta (M) filter, and a cyan (C) filter in a conventional manner.

A lens 22, a black shutter 24, and a color paper 26 are arranged in order above the negative film 20. The arrangement is such that a beam of light which is applied from the lamp house 10 and is transmitted through the light-adjusting filter 60, the mirror box 18, and the negative film 20 forms an image on the color paper 26 by means of the lens 22.

Figure 4:
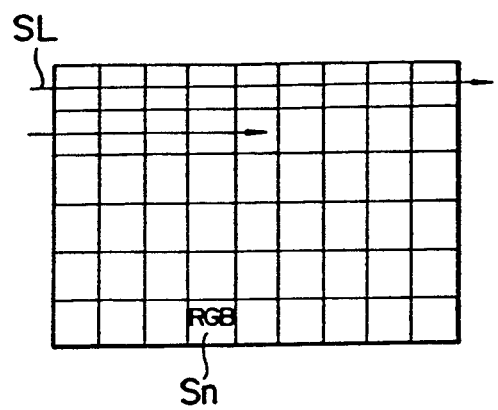
FIG. 4 is a diagram illustrating a state in which photometry is conducted by dividing a film into a plurality of planar segments.

A photometer 28 is disposed in a direction inclined with respect to the optical axis of the aforementioned image-forming optical system and at a position where the image density of the negative film 20 can be photometrically measured. This photometer 28 is constituted by a two. dimensional image sensor, a line sensor, or the like, and effects photometry with respect to a negative image along scanning lines SL by planarly dividing the negative image into a plurality of pixels Sn, as shown in FIG. 4. In this case, the photometry of each pixel is conducted for the three primaries of B, G and R.

The photometer 28 is connected to an arithmetic circuit 30 constituted by a microcomputer or the like for calculating a print exposure. Connected to the arithmetic circuit 30 are a memory 34 for storing data as well as an exposure amount controlling circuit 42 for controlling the print exposure by controlling the light-adjusting filter 60 on the basis of the exposure amount calculated by the arithmetic circuit 30.

Figure 1:
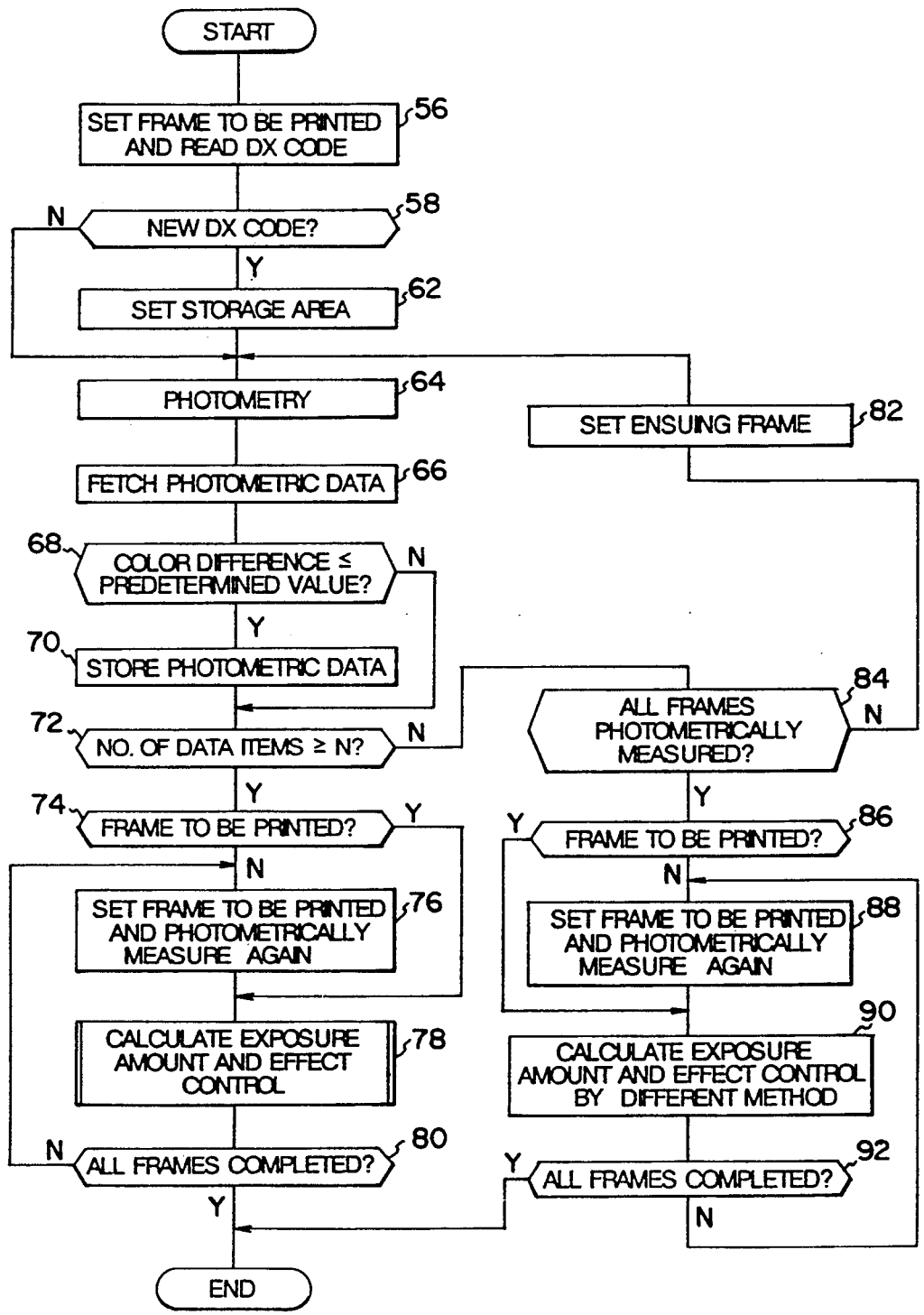
FIG. 1 is a flowchart illustrating a routine for calculating exposure amount in accordance with an embodiment of the present invention.
Figure 2:
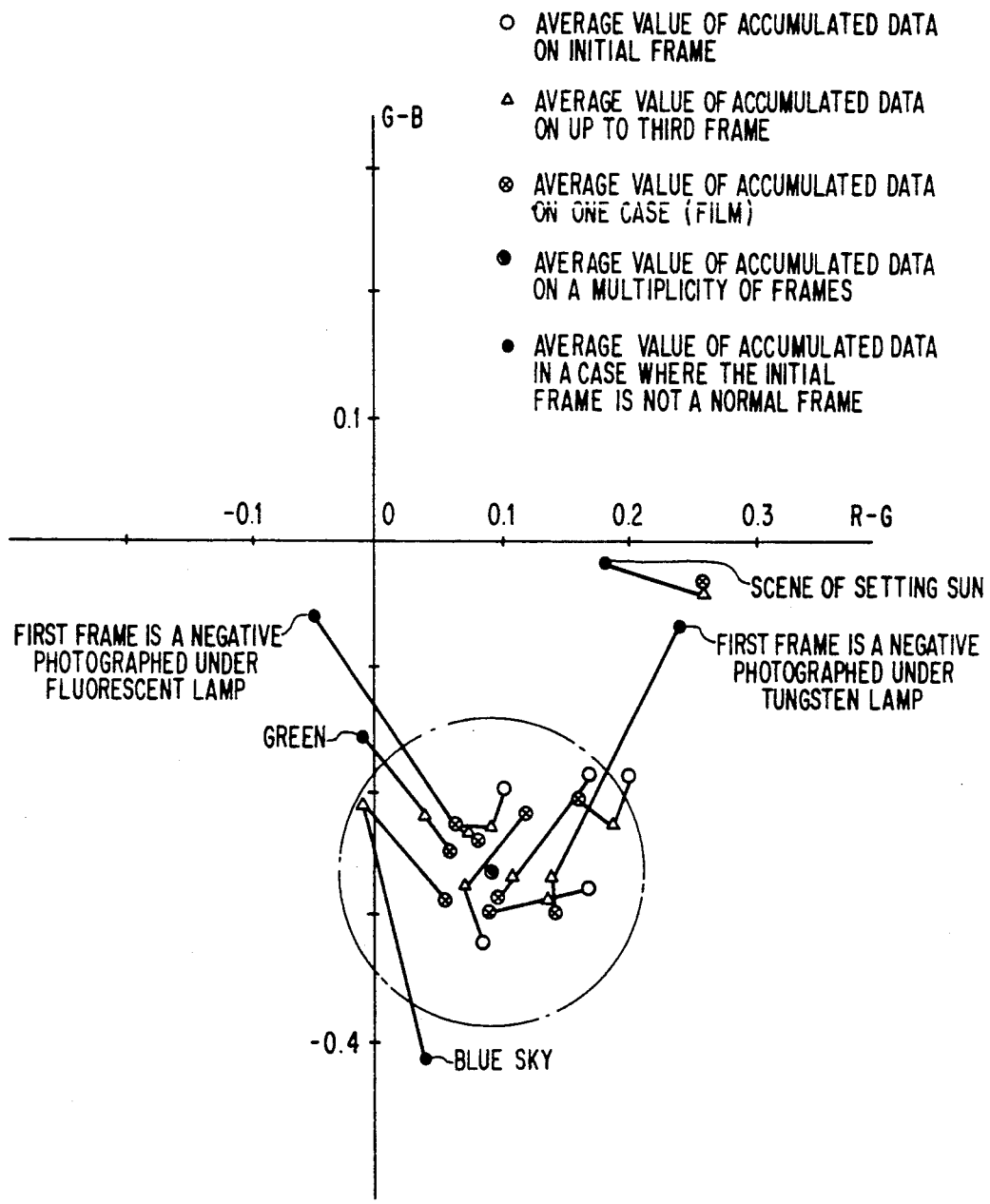
FIG. 2 is a diagram illustrating changes of average values of accumulated data.

Referring now to FIG. 1, a description will be given of a routine for calculating exposure amount by means of the arithmetic circuit 30. In Step 56, an initial frame to be printed is set in an exposing position by driving the negative carrier, and a so-called DX code indicating the film type is read by the photometer 28. In Step 58, a determination is made as to whether or not the DX code read is a new DX code. If it is a new DX code, in Step 62 an area is set for storing data on the film type of the new DX code. In an ensuing Step 64, photometry is conducted with respect to image frames of the roll of film by the photometer 28, and in Step 66 a multiplicity of items of tricolor photometric data obtained by photometry are fetched. In Step 68, by determining whether or not the color difference between an average mask density, i.e., a reference density, stored in advance, and each of the tricolor photometric data, is a predetermined value or less, a determination is made as to whether or not any of the items of photometric data has deviated substantially, i.e., whether or not the colors at the photometric points are substantially imbalanced. If the color difference is the predetermined value or less and a determination is made that the imbalance of the colors is not large, in Step 70, photometric data is stored in a storage area corresponding to the DX code. It should be noted that if the imbalance of the colors is large, the operation proceeds to an ensuing step without storing the photometric data. In addition, the imbalance may be determined by determining the magnitude of the color difference between the average mask density and the photometric data.

In Step 72, a determination is made as to whether or not the number of items of data stored is a predetermined value N or more. Suitable as this predetermined value N is a value which is substantially equivalent to the number of photometric points of one frame, or a value up to several times (e.g., 5-fold) the number of these photometric points. For instance, when the number of photometric points of one frame is 100, N equals approximately 100–500. When the number of items of data stored is not greater than the predetermined value N, a determination is made in Step 84 as to whether or not photometry has been conducted with respect to all the frames. If photometry of all the frames has not been conducted, the negative carrier is driven in Step 82 to set the ensuing frame in the exposing position, and Steps 64 to 70 are executed again so as to store the photometric data which is on that frame.

If the number of items of photometric data stored is the predetermined value N or more, it is determined that the necessary number of items of data has been stored, and a determination is made in Step 74 as to whether or not the initial frame to be printed has been set in the exposing position. If the initial frame to be printed has not been set, in Step 76 the initial frame to be printed is set in the exposing position by driving the negative carrier, and the frame is photometrically measured again by the photometer 28. Then, in Step 78 the exposure amount is calculated by using the photometric data on the initial frame to be printed and by using the stored data, and exposure is effected. In Step 80 a determination is made as to whether or not exposure of all the frames has been completed. If the exposure of all the frames has not been completed, the operation returns to Step 76 so as to set the ensuing frame to be printed in the exposing position, conduct photometry again, and effect exposure. Meanwhile, if the exposure of all the frames has been completed, this routine ends. It should be noted that the data photometrically measured again may be stored by selecting data whose deviation is small as described above.

If it is determined in Step 84 that all the frames have been photometrically measured, i.e., when the number of items of stored data fails to reach the predetermined value N despite the fact all the frames have been photometrically measured, a determination is made in Step 86 as to whether or not the frames to be printed have been set. If the frames to be printed have not been set, in Step 88 the frames to be printed are set and photometry is effected again. In Step 90, an exposure amount is calculated and control is effected in accordance with a method different from that of Step 78.

As the different method just mentioned, it is possible to use a method in which control is effected by determining exposure amount on the basis of the data stored up until that point, and photometric data on the frames to be printed, a method in which control is effected by determining exposure amount on the basis of data prepared in advance and photometric data on the frames to be printed, or other similar methods. In addition, a determination is made as to whether or not a color failure has occurred in the frame. If it is determined that a color failure has occurred in all the frames, the exposure amount may be determined only on the basis of the data stored up until that point. Meanwhile, in the case of a frame photographed under a different type of light source or a frame which has undergone a large change over time, almost all the photometric data on the initial frame to be printed may be stored, and the exposure amount may be determined on the basis of the data thus stored. The same processing can be effected with respect to the second and subsequent frames as well. In this case, the exposure amount may be determined by using photometric data accumulated successively or only on the basis of the data on each frame. A determination as to whether or not the frame has been photographed under a different type of light source (e.g., a fluorescent lamp, a tungsten lamp, or the setting sun) may be effected in accordance with a method described in, for instance, Japanese Patent Application Laid-Open No. 57-21136.

In Step 92, a determination is made as to whether or not the printing of all the frames has been completed, and if the printing of all the frames has not been completed, the operation returns to Step 88 to print the ensuing frame. If the printing of all the frames has been completed, this routine ends.

It should be noted that although a description has been given above of a case in which a storage area corresponding to a DX code is provided by reading the DX code, an arrangement may be alternatively provided such that without reading the DX code, i.e., without providing a corresponding storage area, a storage area is provided, and this storage area is used by being cleared after the printing of a final frame or before photometry of the initial frame of a new film.

In addition, this embodiment can be applied not only to a roll of film but also to a piece of negative film, and the printing of a specific frame can also be effected.

Figure 10:
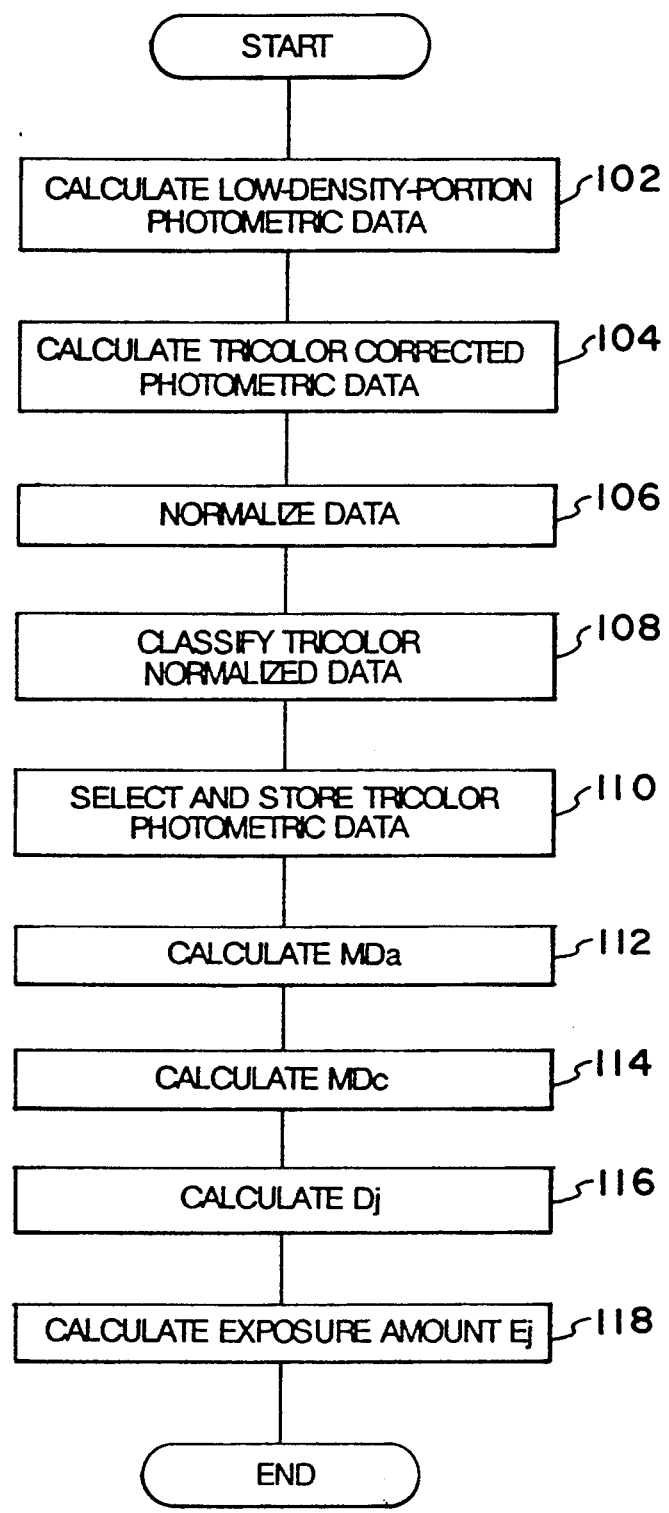
FIG. 10 is a flowchart illustrating the details of Step 78 in FIG. 1.

Referring now to FIG. 10, the details of Step 78 will be described.

In Step 102, by using the average mask density stored in advance in the memory 34 and the tricolor photometric data fetched in Step 66, tricolor low-density-portion photometric data MIN (R), MIN (G), and MIN (B) are calculated as described below and are stored in the memory 34. Parenthetically, the average mask density is determined by averaging the mask densities or the lowest densities of various types of film. A comparison is made between a value which is greater by a predetermined value $\alpha$ (e.g., 0–0.6) than the average mask density on the one hand, and the lowest-density value of the tricolor photometric data or an average value of the tricolor photometric data on the other. If (the average mask density $+\alpha$) > (the lowest density value of the tricolor photometric data or the average value of the tricolor photometric data), the lowest-density value of the tricolor photometric data or the average value of the tricolor photometric data is set as the low-density portion photometric data. Alternatively, if (the average mask density $+\alpha$) < (a lowest-density value of the tricolor photometric data or an average value of the tricolor photometric data), the value which is greater by the predetermined value $\alpha$ than the average mask density is set as the low-density-portion photometric data.

Figure 5:
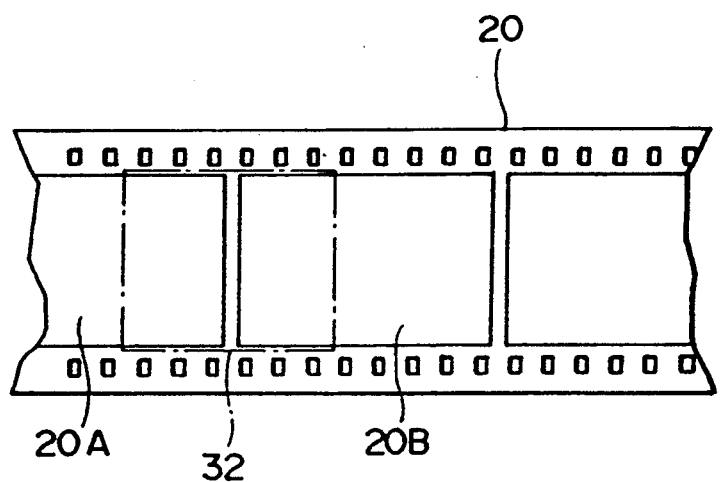
FIG. 5 is a diagram illustrating a state in which a mask density is photometrically measured.

It should be noted that, as shown in FIG. 5, the lowest-density value of the tricolor photometric data obtained with the photometric area 32 of the photometer 28 straddling image frames 20A, 20B may be set as the low-density-portion photometric data. Alternatively, the low-density-portion photometric data may be determined for each film type by storing in advance the mask density, i.e., the low-density-portion photometric data, in the memory 34 for each type of film and by detecting the so-called DX code indicating the film type to determine the film type.

Since the low-density-portion photometric data is determined as described above, there are cases where this low-density-portion photometric data is the lowest-density data on an image-recorded portion of the color film and also where it is the lowest-density data on a portion other than the image-recorded portion of the color film (i.e., the mask density).

In addition, the mask density or the color of the mask may be determined on the basis of the photometric data on the image in accordance with a functional equation for estimation. It should be noted that since a comparison is made by using a color difference or a color ratio as described before, it is preferred that the mask density be used by being determined as the color difference or color ratio of the mask, as described above. In an ensuing Step 104, tricolor corrected photometric data R, G, B are calculated by subtracting the low-density-portion photometric data MIN (R), MIN (G), MIN (B) from the respective tricolor photometric data.

Figure 6:
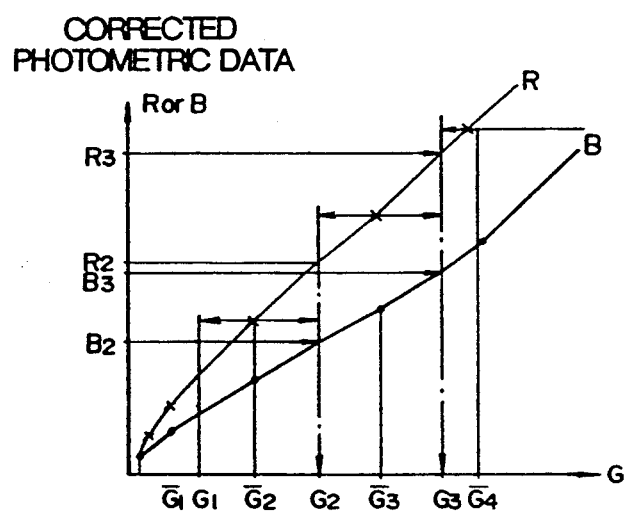
FIG. 6 is a diagram illustrating normalized curves.

In an ensuing Step 106, the tricolor normalized photometric data is calculated by normalizing the corrected photometric data R, B by transforming the same into the density of G by using a normalization table such as is shown in FIG. 6. The film density and the gradation balance vary depending on the type of film and development, so that when an identical object is photographed, the image density and color vary due to the type of film and development. The normalization processing is provided to obtain a fixed density and color on the negative film, irrespective of the type of film and development, by correcting the same for the identical object. In addition, the normalization table is prepared on the basis of a curve indicating the relationship between the average value of the photometric data G and the average value of the photometric data R, as well as a curve indicating the relationship between the average value of the photometric data G and the average value of the photometric data B, all of these data being stored in the memory in Step 70. The aforementioned corrected photometric data R, B are transformed into the density of G by using the above-described normalization table. As shown in FIG. 6, the average value $\bar{R}_3$ of the corrected photometric data $R_2$ and $R_3$ is transformed into the average value $\bar{G}_3$ of $G_2$ and $G_3$, and the average value $\bar{B}_3$ of corrected photometric data of $B_2$ $-B_3$ is similarly transformed into the average value $\bar{G}_3$. At this time, the corrected photometric data G is used as it is without being transformed. As a method for this normalization, it is possible to use the methods disclosed in Japanese Patent Application Laid-Open Nos. 56-1039 and 62-144158 as alternatives to the above-described method.

Through such normalization of corrected photometric data, it is possible to use the same color coordinates even if the film density and the film type differ, and it is possible to set the origin of the coordinate at an arbitrary color. If it is assumed that the average value of the photometric data on a multiplicity of films is gray, the three colors of the normalized data on a gray object become identical by means of the above-described normalization. In practice, since the average value of the photometric data on a multiplicity of films is slightly different from gray, a correction is made by an amount corresponding to that difference.

Figure 7:
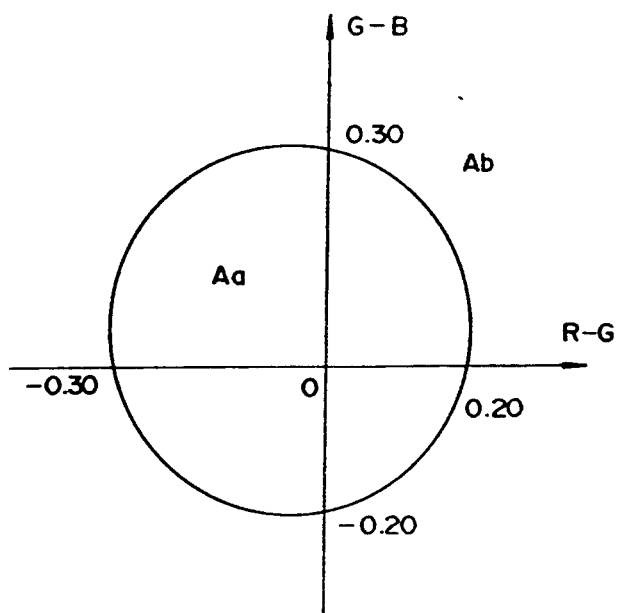
FIG. 7 is a diagram illustrating color coordinates for classifying tricolor normalized data.

In an ensuing Step 108, as shown in FIG. 7, the tricolor normalized data is classified by determining to which color region the tricolor normalized data belongs, in either a color region $A_a$ including the origin or a color region $A_b$ excluding the color region $A_a$, both regions being set on color coordinates with the difference, R–G, between the normalized data R and G taken as the abscissa and the difference, G–B, between the normalized data G and B taken as the ordinate. The tricolor normalized data is classified with the boundary between the color region $A_a$ and the color region $A_b$ serving as a line of demarcation, so that the tricolor normalized data is classified into data belonging to a region where the color difference from a reference value (origin) is small and into data belonging to a region where the color difference from the reference value is large.

The following table shows examples of four color regions with associated data, i.e.: the tricolor normalized data classified for each of these color regions, and tricolor photometric data corresponding to the tricolor normalized data.

TABLE

| Region | Photometric No. | Tricolor Photometric Data | | | Tricolor Normalized Data | | |
|---|---|---|---|---|---|---|---|
| | | R | G | B | R | G | B |
| Aa | 1 | 0.72 | 1.03 | 1.17 | 0.60 | 0.63 | 0.57 |
| Aa | 2 | 0.69 | 1.05 | 1.19 | 0.57 | 0.65 | 0.59 |
| Ab | 3 | 0.62 | 1.15 | 1.21 | 0.50 | 0.75 | 0.61 |
| Ab | 4 | 0.60 | 1.18 | 1.20 | 0.48 | 0.78 | 0.60 |
| — | — | — | | | — | | |
| — | — | | — | | | — | |
| — | — | | | — | | | — |

It should be noted that although in the above the tricolor normalized data is classified by using color coordinates using G –B and R –G as axes, it is possible to use as two- or three-dimensional color coordinates a coordinate axis having as its axis one color or a combination of two or more colors of the three primaries (e.g., Dx −Dy, Dx/Dy, Dx/(Dx +Dy +Dz), Dx +Dy +Dz, Dx −K, Dx/K, etc., where x, y, or z respectively represent a mutually different one color from R, G, and B, and K is a constant), i.e., a coordinate axis having as its axis a color difference other than the above or a color ratio. In addition, a plurality of color regions may be determined in correspondence with a distance from a reference value. As this reference value, it is possible to adopt such as the origin of the color coordinates used, a value concerning a specific color of the original image, a value obtained from an average value of a multiplicity of images, a minimum value taken from the photometric data, a value obtained from photometric data on a specific image, a predetermined specific constant, and so forth. Furthermore, the reference value may be a value given by a functional expression or a table. In this case, the functional expression or table may be such that a reference value changes depending on, for instance, image density. It should be noted that as a specific color of the original image, a neutral color, a color of skin, or a color determined from an average value of a multiplicity of images may be adopted.

Figure 8:
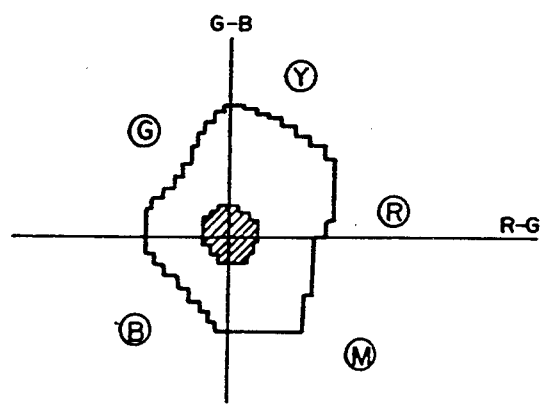
FIG. 8 is a diagram illustrating other color coordinates for classifying tricolor normalized data.

In addition, as a color region, it is possible to use a color region in which a distance to its periphery from an origin provided on coordinates having a neutral color as an origin is irregular, as shown in FIG. 8.

In Step 110, the tricolor photometric data corresponding to the tricolor normalized data belonging to the color region $A_a$ in which the color difference from the reference value is small is selected and stored in the memory 34 to be used as stored data. In Step 112, the selected tricolor photometric data is averaged, and the first image data $MD_a$ is calculated. It should be noted that in cases where the tricolor normalized data is classified on the basis of coordinates having color ratios as axes, the tricolor photometric data corresponding to the tricolor normalized data belonging to a color region in which a color ratio with respect to the reference value is small is selected, and this tricolor photometric data is averaged so as to calculate the first image data $MD_a$.

Figure 9:
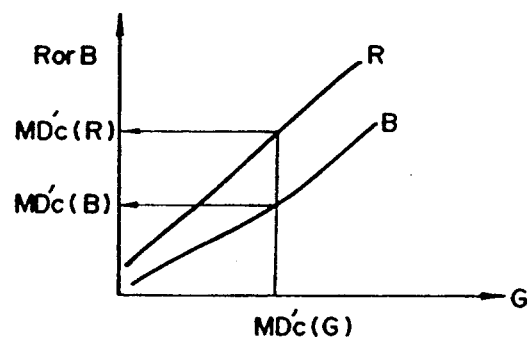
FIG. 9 is a diagram illustrating a method of determining second image data.

In an ensuing Step 114, a second image data $MD_c$ corresponding to a specific color (e.g., a neutral color, or a color which is greater by a fixed color difference or by a fixed color ratio than a neutral color) is calculated. As this second image data $MD_c$, it is possible to use the tricolor photometric data corresponding to the origin of color coordinates shown in FIG. 7. If the density of G in the first image data $MD_a$ is assumed to be $MD'_c(G)$, this tricolor photometric data can be determined by the density of R, $MD'_c(R)$, and the density of B, $MD'_c(B)$, (FIG. 9) by inversely transforming this $MD'_c(G)$ by using the normalization table shown in FIG. 6, and then by adding the low-density-portion photometric data MIN (R), MIN (G), and MIN(B) to the densities of R, G, and B, $MD'_c(R)$, $MD'_c(G)$, and $MD'_c(B)$, respectively, as shown in the following Formulae (1).

$$MD_c(R) = MD_c'(R) + MIN(R)$$
$$MD_c(G) = MD_c'(G) + MIN(G) \qquad (1)$$
$$MD_c(B) = MD_c'(B) + MIN(B)$$

Subsequently, in Step 116, an exposure control value $D_j$ is determined for a print negative in accordance with Formula (2) below, and in Step 118 an exposure amount $E_j$ is calculated in accordance with Formula (3) below. Incidentally, the subscript j indicates R, G, or B.

$$D_j = K_a \cdot MD_a + K_C MD_c \dots \qquad (2)$$

$$\log E_j = C_j \cdot S_j (D_j - D_{jON}) + F_j + d_j \dots \qquad (3)$$

where Ka and Kc are coefficients for weighting, and $K_a + K_c =$ a fixed value (e.g., 1.0); $C_j$ is a coefficient of color correction (=1.0); $S_j$ is a coefficient of slope control (=0.5–2.0); $D_{jON}$ is an exposure control value for a reference image of a reference film type; $F_j$ is a constant determined by the color printing paper and the color printer; and $d_j$ is an exposure correction value based on the content of an image.

The aforementioned weighting coefficients $K_a$, $K_c$ may be altered as shown below in correspondence with the following items (1) to (3) given below.

(1) At the time of setting exposure conditions $$K_a = 0.7 \text{ to } 1.2 \ (0.9)$$

$$K_c = 0.5 \text{ to } 0.0 \ (0.1)$$

(2) At the time of manual printing $K_a = 0.3$ to $0.9$ $(0.7)$ $K_c = 0.7$ to $0.1$ $(0.3)$ (3) At the time of automatic printing $K_a = 0.7$ to $1.2$ $(1.0)$ $K_c = 0.5$ to $0.0$ $(0.0)$ The figures in parentheses are ideal figures.

As described above, the scope of the color region $A_a$ is expanded at the time of setting the exposure conditions or at the time of manual printing, or all the tricolor photometric data is used by suspending the selection of the photometric data. The reason for this as follows: As the coefficient $K_c$ becomes large, the correction for the film type and for an artificial light source deteriorates and the correction for color failure improves, whereas, as the coefficient Ka becomes large, the opposite to the above holds true. However, even if the value of the coefficient Ka is large as a result of the selection of the photometric data, color failure correction, film type correction, and artificial light source correction improve. Hence, since the color failure correction, light source correction, etc. are unnecessary at the time of setting the exposure conditions and at the time of manual printing, there arises the need to weaken the effect of the selection of photometric data so as to effect stabilization.

It should be noted that although in the foregoing description the second image data is determined on the basis of an origin of coordinates shown in FIG. 7, the second image data may be determined on the basis of an average value of the tricolor. photometric data at photometric points included in a neutral region shown by oblique lines in FIG. 8.

In addition, instead of the second image data $MD_c$, data $MD'_c$ shown by the following formula may be used;

$$MD'_c = MD_c - K_j \ldots \text{ptm} \quad (4)$$

where $K_j$ is a correction value which is used not to cause a change in the printed color even if the values of $K_a$, $K_c$ are changed, and no change in color takes place when $MD'_c$ is equal to the average photometric data on each film type. In addition, $K_j$ may be altered depending on the density.

Furthermore, in cases where the low-density portion photometric data is greater than a predetermined value (in the case of an over-exposed film), if the low-density-portion photometric data is corrected on the basis of a predetermined method without using the low-density-portion photometric data, or a predetermined value is used as the low-density-portion photometric data, correction may be effected by using, for instance, the following formula:

$$MIN'(j) = KX_j \cdot MIN(j) \ldots \quad (5)$$

(where $KX_j$ is a coefficient of $KX_j < 1.0$). The average-density-portion data on various types of film may be used as the predetermined values. The present invention can similarly be utilized for digital color printers and image display units such as CRTs.

In the case of effecting a make-over, the following procedure may be taken. Case numbers and average photometric data are stored in the printer, and a case number is printed on the rear surface of each print. Then, the case number of the frame to be made over is inputted to the printer, and the frame to be printed is photometrically measured so as to effect printing.

It should be noted that the present invention is, of course, not confined to the method of correcting photometric data and the method of calculating exposure amount described in connection with FIG. 10 and the method of storing photometric data described in connection with FIG. 1.

What is claimed is:

1. A printing method for a photographic printer for printing an image by conducting at an identical or proximate position photometry effected by dividing an image frame into a multiplicity of segments and exposure based on data obtained by photometry, comprising the steps of:

repeating the process of effecting photometry by dividing the image frame into the multiplicity of segments by consecutively advancing the image frame, and of selecting and storing data necessary for determination of exposure amount, until the number of items of the data stored reaches a predetermined value or more; and positioning an image frame to be printed in an exposing position when the number of items of the data stored has reached the predetermined value or more, and effecting exposure on the basis of photometric data on the image frame to be printed and the stored data.

2. A printing method for a photographic printer according to claim 1, further comprising the step of:

if the number of items of the data stored fails to reach the predetermined value or more even if photometry is conducted with respect to all the image frames of a roll of film, making a determination as to whether or not the image frame has undergone a color failure, and varying the method of using the stored data between an image frame having a color failure and an image frame having no color failure.

3. A printing method for a photographic printer according to claim 2, wherein the image frame having no color failure includes an image frame photographed under a different type of light source and an image frame of a film which has undergone a large change over time.

4. A printing method for a photographic printer according to claim 2, wherein, in the case of the image frame having a color failure, only the stored data is used, while, in the case of the image frame having no color failure, photometric data on at least an initial image frame to be printed is stored and the stored photometric data is used.

5. A printing method for a photographic printer according to claim 3, wherein, in the case of the image frame having a color failure, only the stored data is used, while, in the case of the image frame having no color failure, photometric data on at least an initial image frame to be printed is stored and the stored photometric data is used.

6. A printing method for a photographic printer according to claim 1, wherein the predetermined value is set to be a value substantially equal to the number of items of photometric data on one image frame or a value up to several times the number of items of the photometric data on one image frame.

7. A printing method for a photographic printer according to claim 2, wherein the predetermined value is set to be a value substantially equal to the number of items of photometric data on one image frame or a value up to several times the number of items of the photometric data on one image frame.

8. A printing method for a photographic printer according to claim 1, wherein the data necessary for determination of exposure amount includes photometric data in which one of a color difference and a color ratio with respect to a reference density is a predetermined value or less.

9. A printing method for a photographic printer for printing an image by conducting at an identical or proximate position photometry effected by dividing an image frame into a multiplicity of segments and exposure based on data obtained by photometry, comprising the steps of:
providing a storage area for each type of film by determining the type of film;
repeating the process of effecting photometry by dividing the image frame into the multiplicity of segments by consecutively advancing the image frame, and of selecting and storing in a corresponding storage area data necessary for determination of exposure amount, until the number of items of the data stored reaches a predetermined value or more; and
positioning an image frame to be printed in an exposing position when the number of items of the data stored has reached the predetermined value or more, and effecting exposure on the basis of photometric data on the image frame to be printed and the stored data.

10. A printing method for a photographic printer according to claim 9, further comprising the step of:
if the number of items of the data stored fails to reach the predetermined value or more even if photometry is conducted with respect to all the image frames of a roll of film, making a determination as to whether or not the image frame has undergone a color failure, and varying the method of using the stored data between an image frame having a color failure and an image frame having no color failure.

11. A printing method for a photographic printer according to claim 10, wherein the image frame having no color failure includes an image frame photographed under a different type of light source and an image frame of a film which has undergone a large change over time.

12. A printing method for a photographic printer according to claim 10, wherein, in the case of the image frame having a color failure, only the stored data is used, while, in the case of the image frame having no color failure, photometric data on at least an initial image frame to be printed is stored and the stored photometric data is used.

13. A printing method for a photographic printer according to claim 11, wherein, in the case of the image frame having a color failure, only the stored data is used, while, in the case of the image frame having no color failure, photometric data on at least an initial image frame to be printed is stored and the stored photometric data is used.

14. A printing method for a photographic printer according to claim 9, wherein the predetermined value is set to be a value substantially equal to the number of items of photometric data on one image frame or a value up to several times the number of items of the photometric data on one image frame.

15. A printing method for a photographic printer according to claim 10, wherein the predetermined value is set to be a value substantially equal to the number of items of photometric data on one image frame or a value up to several times the number of items of the photometric data on one image frame.

16. A printing method for a photographic printer according to claim 9, wherein the data necessary for determination of exposure amount includes photometric data in which one of a color difference and a color ratio with respect to a reference density is a predetermined value or less.

* * * * *